United States Patent [19]
Kasuga et al.

[11] 3,867,119
[45] Feb. 18, 1975

[54] APPARATUS FOR MANUFACTURING GLASS FIBERS

[75] Inventors: Kesaharu Kasuga, Tokyo; Takeo Abe; Tsunehiro Haga, both of Koriyama, all of Japan

[73] Assignee: Paramount Glass Mfg. Co. Ltd., Koriyama City, Fukushima-ken, Japan

[22] Filed: Sept. 25, 1973

[21] Appl. No.: 400,696

Related U.S. Application Data
[63] Continuation of Ser. No. 163,578, July 19, 1971, abandoned.

[30] Foreign Application Priority Data
July 20, 1970  Japan.............................. 45-63420

[52] U.S. Cl............................ 65/12, 65/1, 65/11 R
[51] Int. Cl............................................. C03b 37/02
[58] Field of Search............ 65/1, 2, 7, 12, 16, 11 R, 65/11 W

[56] References Cited
UNITED STATES PATENTS
| | | | |
|---|---|---|---|
| 2,672,857 | 6/1972 | Stalego | 65/12 |
| 3,251,665 | 5/1966 | Bour | 65/12 X |
| 3,333,933 | 8/1967 | Mitchell | 65/12 |

FOREIGN PATENTS OR APPLICATIONS
| | | | |
|---|---|---|---|
| 969,905 | 9/1964 | Great Britain | 65/1 |
| 286,158 | 2/1971 | U.S.S.R. | 65/1 |

Primary Examiner—Robert L. Lindsay, Jr.
Attorney, Agent, or Firm—Stevens, Davis, Miller & Mosher

[57] ABSTRACT

Glass filaments with a narrow range of diameters for use in method of glass fiber production are prepared by discharging the molten glass under gravity flow through a novel multi-orifice bushing plate having a first, or inner, bushing plate adapted to support a charge of molten glass and provided with a plurality of tubular discharge orifices extending downwardly therefrom, and a second or outer, bushing plate spaced from said first plate approximately at the outlet tips of the discharge orifices, said outer plate being electrically conductive and adapted to be heated by the controlled flow of electricity therethrough to regulate the temperature of glass streams discharging through the orifices and a third plate located between and parallel to the inner and outer plates in heat conductive relation to the tubes extending therethrough. If desired, water-cooled heat-absorbing fins may be provided at selected locations on the outer bushing for further control of the temperature of the glass streams.

5 Claims, 14 Drawing Figures

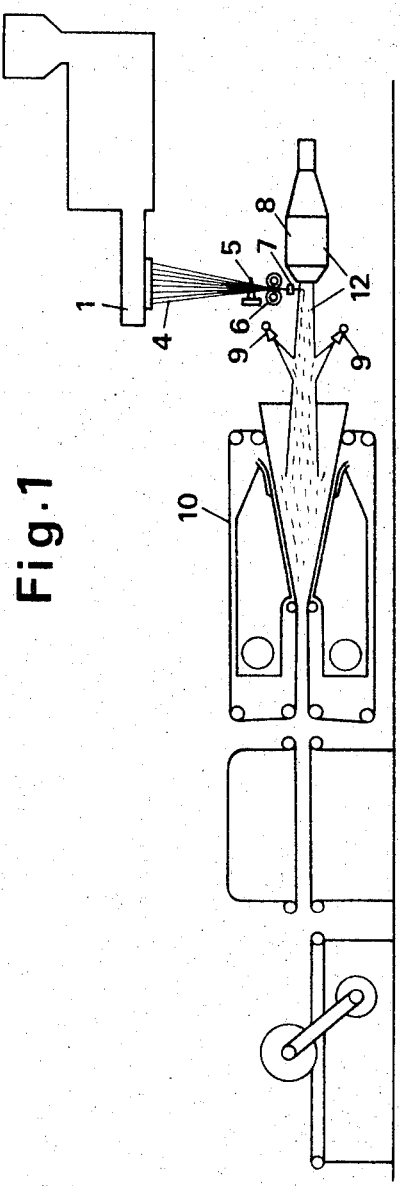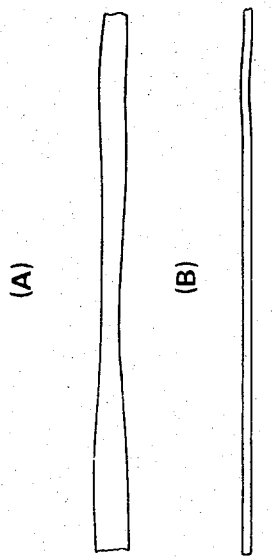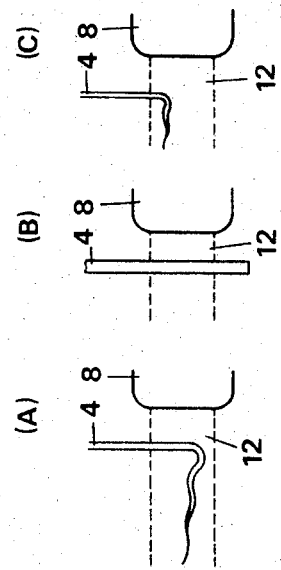

PATENTED FEB 18 1975

APPARATUS FOR MANUFACTURING GLASS FIBERS

This is a continuation of application Ser. No. 163,578, filed July 19, 1971, now abandoned.

In manufacturing glass wool, the most widely-used method is based upon the employment of centrifugal force. Another method, the so-called slit method, does not form primary filaments from molten glass but forms the fibers by blowing the glass with air or steam. A third method which produces high quality glass wool with substantially uniform fine fibers by the so-called jet blast method is more expensive due in part at least, to the necessity for first forming filaments of the glass in a primary step with certain problems in respect to the thermal economy.

This invention relates to the jet blast method of glass fiber manufacture and more particularly to the production of the glass filaments used therein.

It is an object of this invention to provide a method and apparatus to produce such starting filaments of uniform and controlled diameter.

It is a further object of this invention to provide equipment for producing glass fibers of controlled and uniform diameter on an industrial scale.

These and other objects will be apparent from the following description and the accompanying drawings in which:

FIG. 1 is a diagrammatic drawing of glass wool manufacturing apparatus by the jet flame method;

Figure 5:
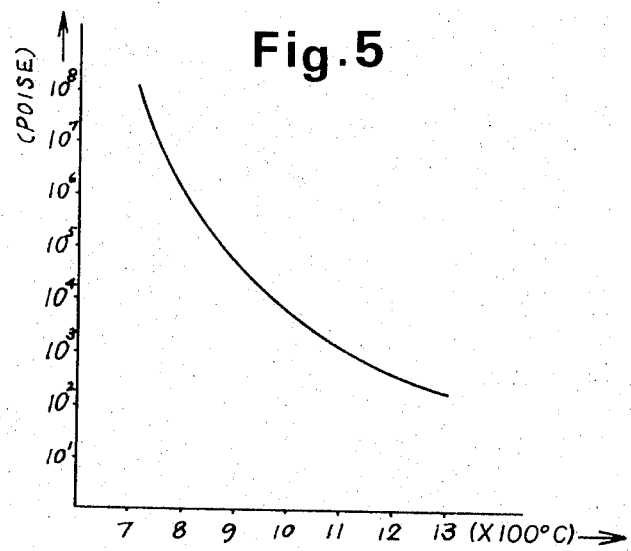
Figure 6:
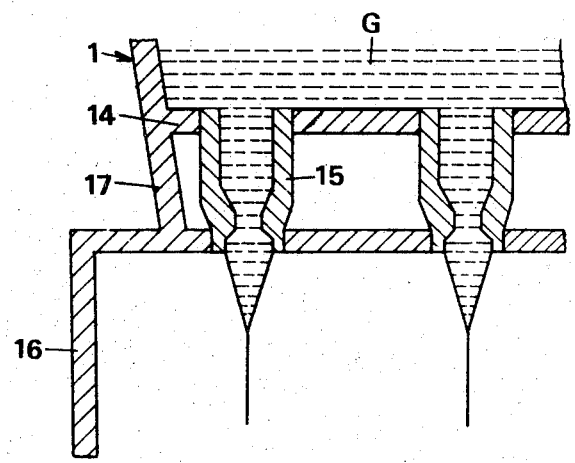
Figure 7:
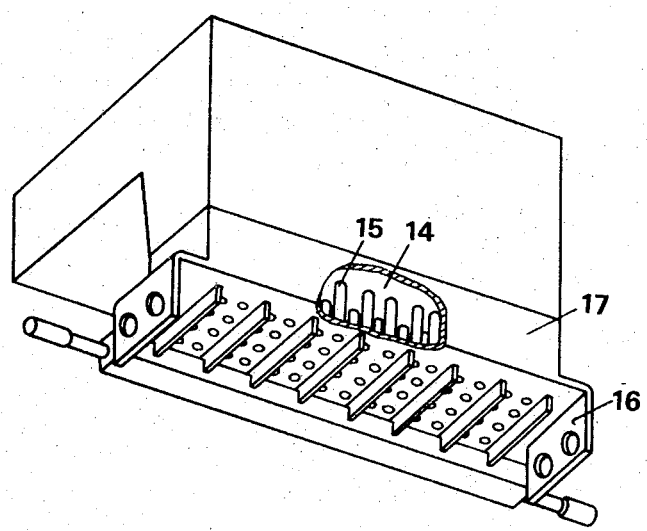
Figure 8:
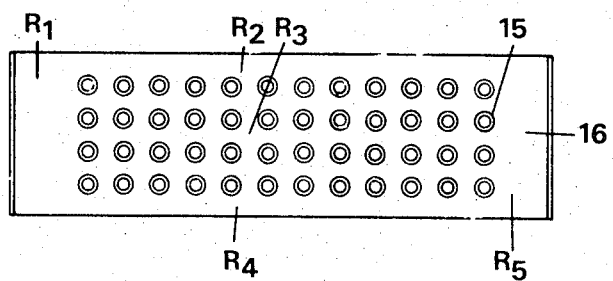
Figure 9:
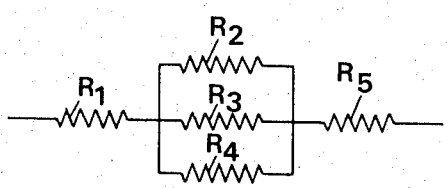
Figure 10:
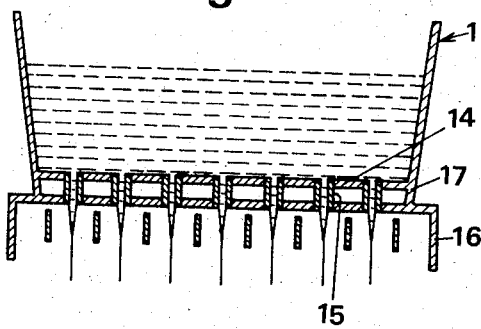
Figure 11:
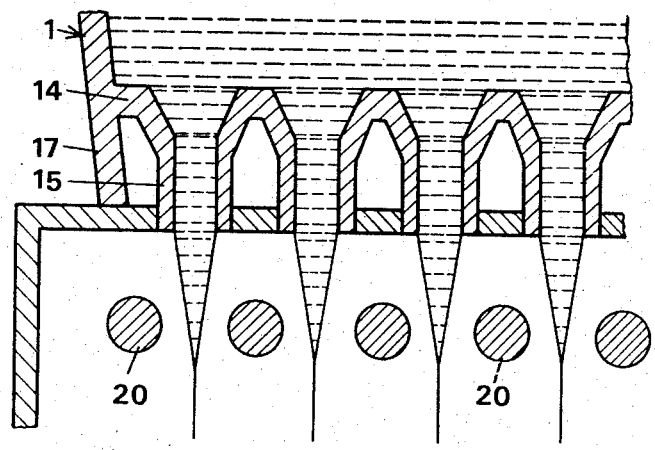
Figure 12:
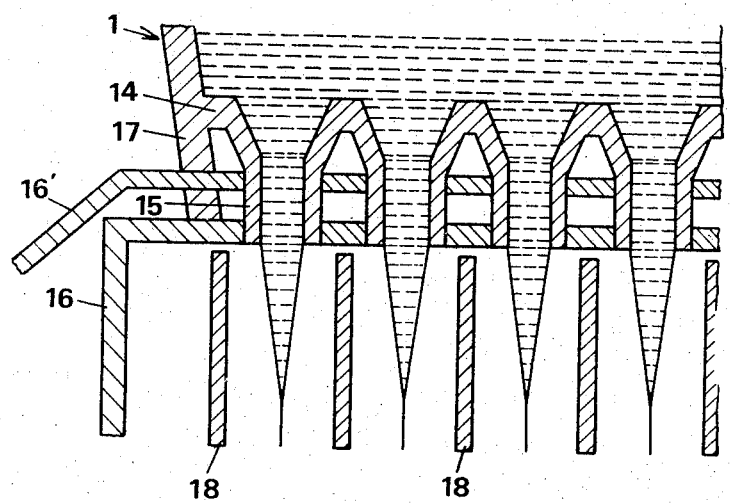
Figure 13:
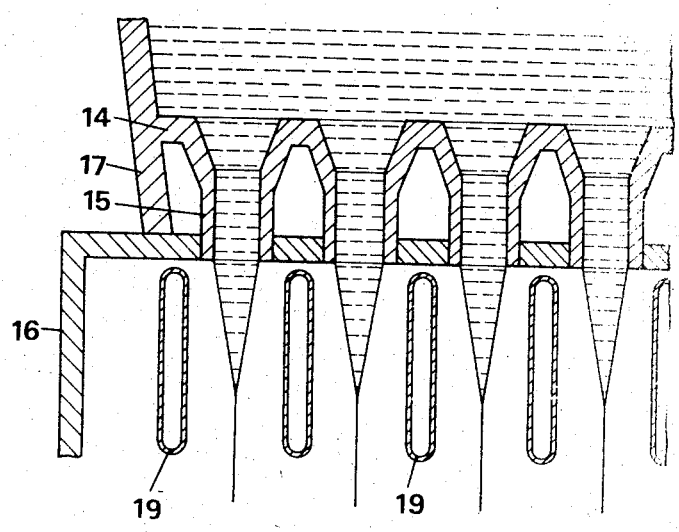
Figure 14:
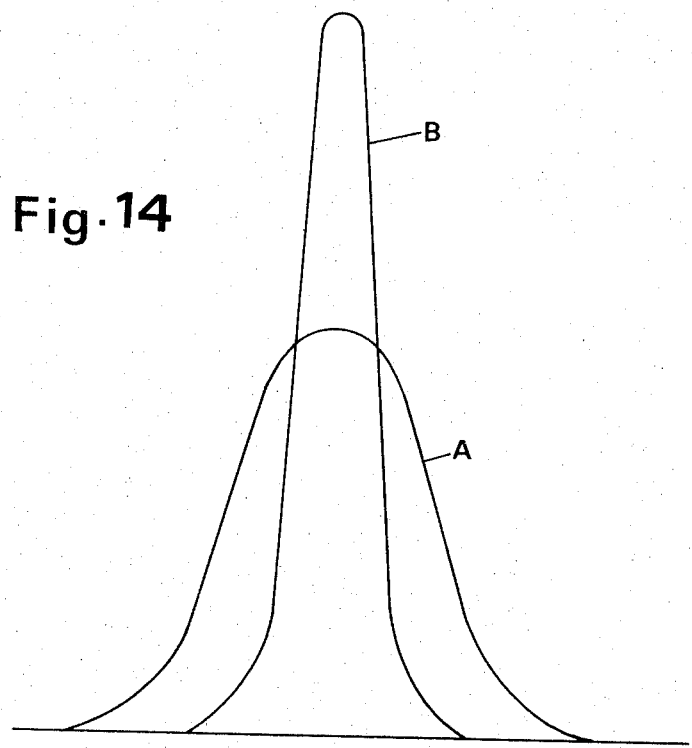

FIGS. 3 (A), (B), and (C) illustrate possible different glass fiberizing conditions in the jet flame system;

FIGS. 4 (A) and (B) are enlarged side views of the primary glass filaments;

FIG. 5 is a temperature and viscosity curve of glass used manufacturing glass wool;

FIG. 6 shows enlarged cross-section of portion of a furnace bottom according to the invention;

FIG. 7 is a perspective view partly in section, of one embodiment of the invention;

FIG. 8 is a plan view of an electric resistance heated bottom bushing;

FIG. 9 is a electric resistance heating diagram of the bushing indicated in FIG. 8;

FIG. 10 is a sectional view of another embodiment of the invention;

FIGS. 11, 12, and 13 are each enlarged sectional views of other embodiments of the invention;

FIG. 14 is a frequency curve with the diameter of the primary filament ($\mu$) as the horizontal axis and the filament length as the vertical axis, comparing the frequency of the filament produced according to the invention with that of the filaments produced according to previously known methods.

Figure 2:
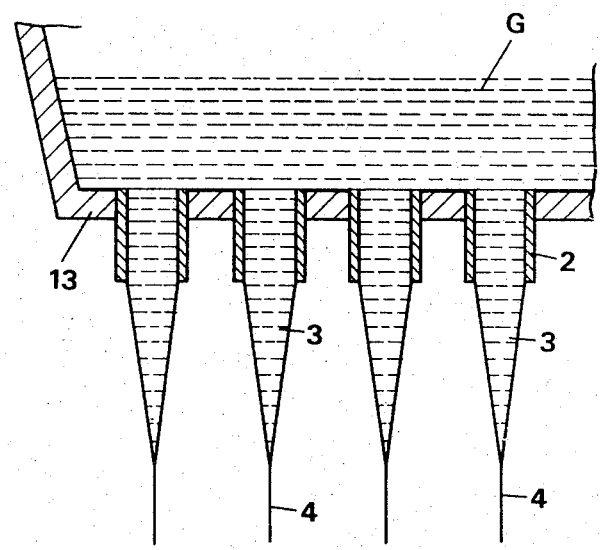
FIG. 2 is an enlarged cross-sectional view of a portion of a conventional furnace bottom.

In glass wool manufacturing by the jet blast method as shown in FIG. 1, the melting furnace 1 is provided with a number of protruding forming orifices 2 arranged lengthwise and crosswise at its bottom, as shown in FIG. 2. As the molten glass from the furnace passes through each orifice 2, the molten glass will radiate some of its heat so that the molten glass flowing out of each of the orifice tips normally forms a cone 3, due to the decreased temperature and increased viscosity. At the tip of cone 3 the glass stream is further cooled forming a filament 4. The several filaments, arranged in a parallel and substantially equally-spaced arrangement by primary guide 5, are drawn by roller 6 and passed through a secondary guide 7 into a high-temperature, high-velocity jet blast 12 from burner 8. A suitable binder is applied by spray 9 to the resulting glass fibers which are collected in the collection chamber 10 and passed through curing oven 11. These fibers may be formed into glass wool products such as batts, boards and rolls, as desired.

In manufacturing glass wool by this method, the diameter of the primary filament should be as uniform as possible since the jet blast efficiency of the burner 8 is seriously lowered by variations in the diameters of the filaments.

Thus, as shown in FIG. 3(A), for a given diameter of a primary filament 4 and temperature and thickness of the jet blast 12, the temperature of the primary filament inserted in the jet blast will tend to increase from its outer surface towards the center of the filament and when the filament reaches the bottom part of the jet blast the glass temperature at the center will have reached its softening point so that the filament is fiberized by the blast.

If the diameter of primary filament 4 is too coarse in respect of the jet blast temperature and thickness, the primary filament axis will pass through the bottom part of the jet blast before reaching its softening point so that the filament will not be fiberized, as shown in FIG. 3(B).

If the primary filament diameter is too fine in respect of the jet blast temperature and thickness, the primary filament 4 will fiberize at the upper part of the jet blast 12 so that much of the effective area of the jet blast 12 will not be utilized effectively, as shown in FIG. 3(C). Where the primary filaments drawn out from the orifices of the glass filament manufacturing bushing 1 vary substantially in diameter, the jet blast 12 temperature and thickness would be adjusted to the coarsest filaments so that most of the other (i.e., finer) filaments will be in a condition as in FIG. 3(C) where the jet blast efficiency is quite low.

To the end that jet blast efficiency for the fiberizing should be promoted as described above, it is necessary that the primary filaments have as uniform diameter as possible.

One expedient for increasing production by the jet blast method is to preheat the primary filaments before entering the jet blast. In this case the jet blast efficiency will be substantially increased with resulting fuel savings. However, if there are differences in diameter of the primary filaments then the temperature of the preheated primary filaments will correspondingly differ so that the full benefits of such preheating on the jet blast efficiency will not be realized. Thus, even where primary filament preheating is employed, it is very important that the primary filaments are of substantially uniform diameter to achieve the desired jet blast efficiency and to improve the quality of the fiber product.

For satisfactory mass production of glass wool by this method, it is necessary to prepare the primary filaments on a large scale using a remelting furnace supplied directly by a glass manufacturing tank furnace.

In order to flow the molten glass smoothly in the forehearth connecting the tank furnace and the bushing described below, it is necessary to have the molten glass at a high temperature, low viscosity, and high glass level.

On the other hand, at the orifice tips in the bushing where the primary filaments are formed as described below, it is necessary to maintain a constant high viscosity by a comparatively low temperature. Thus, mass production of glass wool by the jet blast method requires in the preliminary filament-making stage an initial high temperature molten glass but requires low temperature glass in forming the filaments. These contrary requirements are solved by this invention.

Another problem with which this invention is concerned is that of primary filament diameter variations. These are kept extremely small by the novel orifice construction and electrically heated under end orifice tubes as described hereinafter. Generally speaking, a glass fiber bushing will tend to have higher temperature at the middle of the bushing plate and have a tendency to have lower temperature around the outside of bushing plate. That is, the multi-protruding orifice provided at the bottom of the conventional bushing plate will have different degree of cooling from the atmosphere at the outer and inner areas of the bushing plate.

The bottleneck for the mass production of either continuous fiber or glass wool is the temperature variation in and around the bushing and the unstable dimension and shape of the filament forming cones in forming primary filaments.

Heretofore, this problem has been approached by raising the temperature of the outside area of the bushing by some form of electrical resistance heating. However, there is a limit in that expedient and so far it has not been feasible to make the bushing plate larger than a certain size. For this reason the so-called multi-hole bushing equipment has not been regarded as acceptable for increasing production of glass wool.

This invention compensates for such differences by electric heating and enclosing the space between the bushing bottom and electric heated plate for controlled heat exchange. By controlling the rate of flow of the molten glass passing through the orifice tubes and maintaining a substantially uniform temperature in the several orifice tubes, it is possible to maintain substantially uniform diameter in the primary filaments flowing out from the bushing.

In regard to the mechanism of the primary filament formation, the diameter of the filament is determined by several factors: first, the amount of glass flow through the bushing orifice and its drawing speed; and second, atmospheric cooling of the filament-forming cone immediately under the bushing orifice. First, the rate of glass flow through the bushing orifice and its drawing speed determines the average diameter of the long section of the primary filament, however, as shown in FIG. 4(A) it is not always substantially uniform, but varies in a random manner. To secure a constant diameter as shown in FIG. 4(B), it is necessary to have a constant cooling effect, which is the second factor, by the atmosphere at the filament-forming cone immediately under the bushing orifice. Assuming that the cooling is constant from the atmosphere at the filament-forming cone under the bushing orifice, the bushing end and its middle, the orifice diameters are all the same dimension and the molten glass layer temperature at the orifice openings is uniform, the end of the bushing will be cooled more than at its middle. This may be explained by a consideration of the function of the orifice in filament forming.

The average viscosity of the glass at the filament-forming cone just under a bushing orifice is $10^3$ to $10^4$ (poise), and the temperature which gives this viscosity is about 980°C. as shown in FIG. 5. On the other hand, to obtain a uniform temperature of the molten glass it is desirable that it be molten at a comparatively high temperature. That is, when the molten glass temperature is high the viscosity will be low and the molten glass on the bushing will have a smooth flow and readily cause convection heat transmission. Therefore, the molten glass temperature should be constant in the horizontal plane just above the bushing orifices, for uniform temperature and viscosity of the molten glass entering the orifices. Preferably, the molten glass temperature should be about 1030°–1050°C. in this zone above the surface of the bushing plate. It is necessary to drop the temperature 70° to 50°C. to make it 980°C. at the primary filament-forming cone from such a comparatively high temperature. Protruding orifices as in FIG. 2 are quite effective in providing that degree of cooling. However, in the structure of FIG. 2 the cooling effects at the end and middle sections of bushing plate differ so that the molten glass temperatures in the orifices also differ. Consequently, the first factor for determining the primary filament diameter, the amount of molten glass flowing through the orifices, will likewise differ, and the primary filaments will have different diameters.

That is, the plate end shown in FIG. 2 is in a position to be readily cooled by the atmosphere, the molten glass passing through the orifices at the end of the plate will have a great temperature drop thereby increasing the viscosity, so that the flow of molten glass passing through the orifices at the end of the plate will decrease and when the primary filaments are formed their diameters will be relatively small. Conversely, at the middle of the bushing plate it is difficult to cool the orifices by the atmosphere and the molten glass passing through the orifices in the middle of the bushing plate will not drop in temperature as much as that at the end of the bushing plate. Being less viscous, the volume of molten glass passing through the orifices at the middle of the bushing plate will be larger than that passing through the orifices at the end of the bushing plate, so that the primary filaments formed therefrom will have larger diameters. Consequently, uniformity of primary filament diameter cannot be secured under conditions such that the orifices at the bushing plate ends are cooled by the atmosphere substantially more than those in the middle sections of the plate.

It has been proposed, as a solution to this problem, to heat the bottom plate by electric means, balancing all bushing orifice temperatures by controlling power input. However, that method is not practicable for operations requiring a substantial number of such orifices.

The molten glass on the bushing is a high viscosity fluid, so if the temperature increases at any location its viscosity will correspondingly drop and at the position more glass will flow through the orifice and create a molten glass path. With increased flow of high temperature molten glass the temperature of the orifice at this position will keep an increasing and the primary filament diameter also will keep on increasing. Further, if there is a section in the lengthwise and sidewise rows of orifices where the temperature is low, the molten glass viscosity in that section will increase whereby the amount of molten glass passing through the orifices per unit time at this position will be less than at other sections. The molten glass path will become narrower and the temperature of the orifice at this position will become lower and lower, resulting in thinner primary filaments.

As described in detail above, if there is a temperature variation among the orifices used for drawing out primary filaments, a preferential molten glass path will be caused thereby so that the difference will become larger as the primary filament drawing time proceeds and the diameter variation in the primary filaments will become larger. To solve this problem, means must be provided to insure a substantially uniform temperature distribution throughout the bushing plate and its associated nozzles from the beginning of the filament drawing run and continuing therethrough.

In this invention, these problems have been solved by the following system. The conventional orifice plate 13, as shown in FIG. 2, is drilled with many orifices at the bottom of the bushing and these orifices 2 as tips from the exterior of the bushing into the atmosphere. In the invention, on the contrary, as shown in FIG. 6 and FIG. 7, the bottom plate 14 of the bushing (hereafter referred as the inner bushing plate) is provided with tubes 15, and their tables are connected by an electric conductive material 16 (hereafter referred as the outer bushing plate) arranged to give a double plate orifice section. If desired, by utilizing an intermediate bushing plate 16' as shown in FIG. 12, a triple plate structure may be formed wherein the inner bushing plate 14 and intermediate bushing plate 16' have corresponding drilled holes and these holes are connected with tubes 15 respectively and this orifice group is enclosed within a wall 17 at its circumference for insulating the orifice section.

The intermediate spaces between inner bushing plate 14 and outer bushing plate 16 and among the tubes 15 is an air space.

In this double plate bushing structure the inner bushing plate 14 will be of a material and thickness to carry the pressure of the molten glass in the apparatus and glass will flow through all orifices. Therefore, the inner bushing plate 14 will be substantially at the temperature of the molten glass, whereas the outer bushing plate 16 will carry a relatively light load and is made of electric conductive material. When current is supplied thereto plate 16 is maintained at a constant and controlled temperature independently of the temperature of the molten glass flowing through the tubes 15. For this reason, the glass flowing from the inner plate 14 is substantially at a uniform temperature at the tubes 15 as it flows out to the cone formation section. Ideally, the molten glass above the bushing plate 14 will flow to the tubes 15 at a uniform temperature across that plate. However, as described above, the molten glass is highly viscous and tends to have a higher temperature at the middle part of the zone due to heat losses peripherally. In actual practice, it is most difficult to compensate for even a small temperature variation in the body of glass on the plate 14. On the other hand, by concentrating on the small volumes of glass passing through the tubes 15 Applicants have been able to maintain the desired uniformity of temperature at the zone.

If there should be any differences in temperature between molten glass flowing through the tubes in one section of the plate as compared to the temperature in the tubes of other sections, these may be equalized by the electrically heated outer plate 16 as explained above. The molten glass will have some residence time within the tubes 15 and each portion of the molten glass within a tube will itself radiate heat and cool down to a uniform temperature by the time it flows out of the orifice of tube 15 (that is, at the point of formation of the cones). During this period the temperature within the tubes tends to equalize. The air spaces surrounding the tubes 15 between plates 14 and 16 also contribute to this equalization. As a result of these conditions the molten glass flowing out the tubes 15 will have a substantially constant temperature regardless of temperature drop variations between the orifices in the middle part of the bushing 16 as compared to the outer ones due to the greater heat loss by radiation at the outer positioned orifices. As shown in FIG. 8 the lower bushing plate 16 is made of electrically conductive material with the electric resistance at the terminal ends being R1 and R5, R3 in the area of the orifices and R2 and R4 on the long sides as represented by the circuit diagram, FIG. 9.

Around the orifices 15 the sectional area of the plate 16 is smaller and the electric resistance will be larger so the current flow will be concentrated at the sides R2 and R4. Conventional controls may also be provided to vary the heating effect in the individual sections.

If alternating current instead of direct, is used, it will also concentrate at R2 and R4 due to skin effect.

Further compensation for such temperature distribution variations may be effected by arranging the orifice distribution so as to be further apart at the middle, and closer together at the ends.

Adjustment may also be made by changing the thickness of the outer bushing plate 16. Another expedient is to provide for the orifices at the end a heat compensating source equal to their greater losses by radiation and/or thermal transmission. In some instances, it may suffice to widen the bushing lower plate in the intermediate section so as to increase the radiation of the protruding section to equal that of the ends. Whatever the means adopted the temperature drop in the orifices will be uniform whether in the middle or the end sections.

The small open space provided at the outer walls 17 is required for the release of the expansion in the air resulting from the heating of the outer walls at bushing 16.

By the described means, the temperature within the outer walls 17 is maintained substantially uniform and the molten glass in the tubes has a substantially uniform temperature.

Thermal resistance metals such as stainless steel, platinum alloy, etc., are suitable for the inner plate 14, tubes 15, and walls 17. If desired, heat resistance materials such as refractories may be used.

Referring again to FIG. 1, the molten glass passing through the orifices of the filament-forming apparatus as described above, upon reaching the orifice tip will be drawn by the roller 5 to form primary filaments 4 from the forming cones. The molten glass cones at the orifices positioned at the outer circumference are readily cooled by the atmosphere but the outer bushing plate 16 of this invention as described above will have a uniform temperature distribution horizontally and compensates for the heat escaping to the atmosphere. Consequently, the cone formation conditions at the orifices' tubes are substantially alike even close to the outer walls, so that the viscosity and surface tension of the flowing molten glass will have the desired balance to form cones and primary filaments.

If the molten glass temperature flowing out the orifices is low, the molten glass viscosity will be high. The surface tension of the molten glass will function to contract the shape of the cones, and the resulting attenuated primary filaments will have a smaller diameter.

When the molten glass temperature becomes lower than a certain limit the molten glass viscosity becomes so high that it will not flow in the orifice and it is impossible to form primary filaments. Conversely, when the temperature of the molten glass flowing out the orifices is high, the molten glass viscosity will be low, the distance from the tip of the cone to its base will be long, and the primary filaments formed will have larger diameter.

When the molten glass temperature exceeds a certain limit the molten glass cone weight and surface tension will be out of balance and become unstable, as a consequence of which the cones will vary pulsatively. The primary filaments formed in such conditions will have a diameter as shown in FIG. 4(A). In such cases, the conditions of FIG. 3(A) and (C) will repeat constantly, and in order not to have the conditions of B, as previously explained, the jet blast utilizing efficiency will drop markedly. Further, if the molten glass temperature exceeds a certain limit, the molten glass cones' weight and surface tension become so unbalanced that it is impossible to form cones, but form drops instead which fall in a discontinuous state, instead of the primary filaments which are necessary for manufacturing glass wool.

While it is necessary to maintain a certain high temperature in the molten glass until it has passed through the under end of orifice tubes, it is necessary to cool it rapidly thereafter to maintain the desired cone shape. For this purpose fin-shaped cooling plates 18 or 19 are provided close to the cone-shaped molten glass as shown in FIGS. 10, 12 or 13. These may be water cooled, or, as FIG. 11, employ a substance 20 including water by capillary action to take away heat from its surroundings by evaporation, as is well-known.

In this invention, tubes 15 are joined to the inner plate 14 and also to the electric conductive outer plate 16 and further the space between the said outer plate 16 and the inner plate 14 circumference is enclosed by the outer walls 17 which makes the orifice assembly very rigid so that it is possible to provide such cooling means directly under this apparatus. That is, the structure formed by the inner and outer plates 14 and 16 positioned above these cooling fins is quite resistant to warping and thus permits very close tolerances for the positions of the cooling fins (installing allowance within 0.5 to 1 mm).

The method and apparatus of this invention as explained in detail above for manufacturing wool type products may also be employed to manufacture yarn products (continuous glass fiber products). In such case, using for example the structure shown in FIG. 7, the molten glass will pass through the temperature controlled lower bushing plate and form cones and then be drawn to fibers, which are gathered together by a gathering shoe and apply binder to form strands and by a traverse apparatus wound on a rotating collet.

Referring now to FIG. 14, glass strands made by conventional methods will have the diameter distribution indicated by the curve A, whereas those strands produced according to the instant invention will have a filament diameter distribution indicated by the curve B, thereby yielding very uniform quality products.

Consequently, the tensile strength of the strands will be very much higher, that is, a strand composed of number of filaments with a substantial filament diameter variation, will break under load at the finer filaments and eventually break the whole end. The frequency of end breaks determines whether the fiberizing of continuous glass fibers is a good or poor operation. Further, if reinforced plastics are made out of these fibers with a small diameter variation the quality of product is very high and since less strands will give the required strength, the material costs will be reduced.

This invention may also be employed for staple type glass fibers. The double bushing plate structure of the invention substantially increases its bending strength so as to withstand thermal warps and glass head pressure thereby making it possible to use bushings having a wider perforated area with a greater number of filament-forming orifices as compared to conventional bushing plates.

Another advantage is the small degree of warping in the bushing plate. This is so slight that it may be ignored for practical purposes and permits installing the in close proximity to the orifices. This, in turn results in greater stability in the glass cones at the under end of orifice tubes whereby lengthwise diameter variations in the primary filament are kept to a minimum and the jet blast utilization efficiency is greatly improved.

A further advantage from this invention is the uniformity of filament diameter coupled with the substantial increase in the drawing speed of the primary filaments which facilitates the preheating of the filaments before passage into the jet blast.

Further, the apparatus of this invention in functioning to maintain a uniform temperature of the small glass streams flowing in the orifices tends to be self-balancing so that some of the conventional temperature controls may be eliminated, with a consequent simple friction of the automatic controlling equipment.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. Apparatus for manufacturing glass filaments comprising means for holding a body of molten glass to be formed into said filaments, said means having an inner rectangularly-shaped bushing plate for supporting said body, a plurality of tubes extending below said inner plate each communicating with said holding means through an orifice in said inner plate whereby molten glass may flow out of said holding means, an outer rectangularly-shaped bushing plate spaced from said innder bushing plate spaced from said inner bushing plate, the space between said outer bushing plate and said inner bushing plate being filled with air and enclosed, said outer bushing plate being provided with a plurality of equally spaced apertures corresponding in number and arrangement to the said orifices also equally spaced, to receive the lower ends of said tubes, said lower ends being disposed without extending downward below said outer bushing plate, said outer plate being made of electrically-conductive material providing electrical resistive heating zones therein, and means for supplying an electric current to said outer plate and a third plate located between and parallel to the inner and outer plates in heat conductive relation to the tubes extending therethrough.

2. Apparatus according to claim 1 in which means for cooling molten glass flowing from at least some of the tubes are provided below the bottom plate.

3. Apparatus according to claim 2 in which the cooling means include a liquid coolant.

4. Apparatus according to claim 1 in which the heating zones are provided with separate controls.

5. Apparatus according to claim 1 in which portions of the outer plate extend outwardly of the glass holding means and are bent downwardly to deflect air currents around the lower ends of the tubes.

* * * * *